J. W. KERN.

Car-Wheels.

No. 136,068.

Patented Feb. 18, 1873.

WITNESSES.
E. H. Bates.
Geo. E. Upham.

INVENTOR.
Jno. W. Kern,
Chipman Hosmer & Co,
Attys.

UNITED STATES PATENT OFFICE.

JOHN W. KERN, OF PORTLAND, OREGON.

IMPROVEMENT IN CAR-WHEELS.

Specification forming part of Letters Patent No. 136,068, dated February 18, 1873.

*To all whom it may concern:*

Be it known that I, JOHN WILLIAM KERN, of Portland, in the county of Multnomah and State of Oregon, have invented a new and valuable Improvement in Car Wheels and Axle; and I do hereby declare that the following is a full, clear, and exact description of the construction and operation of the same, reference being had to the annexed drawing making a part of this specification, and to the letters and figures of reference marked thereon.

Figure 1:
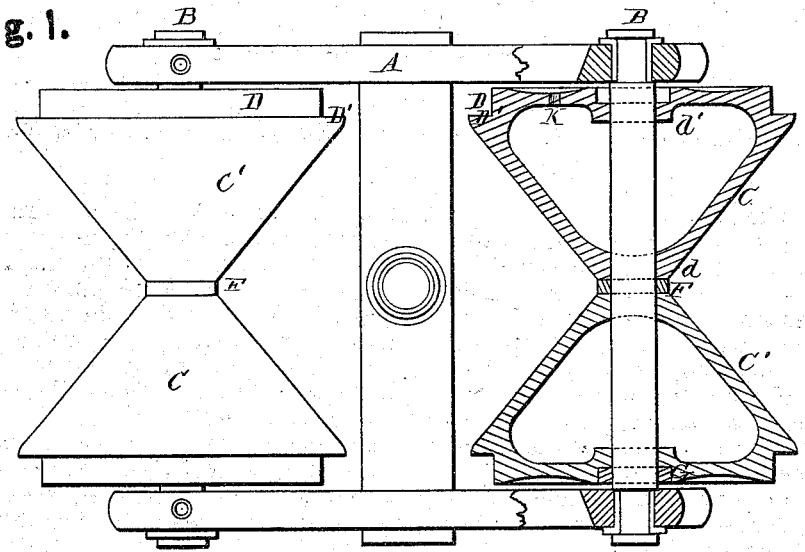
Figure 2:
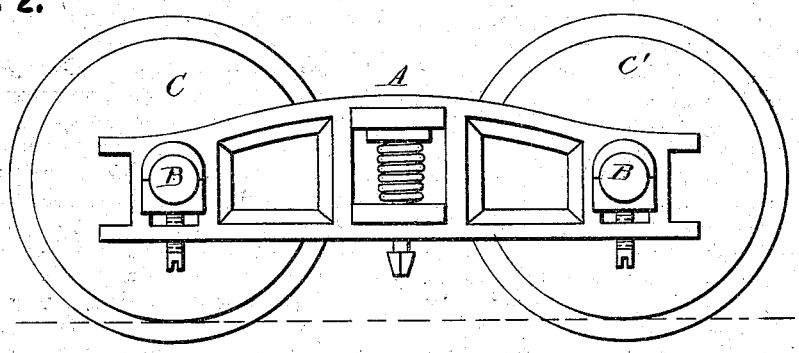
Figure 3:
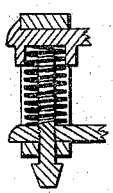

Figure 1 of the drawing is a representation of a plan view, part sectional, of my invention. Fig. 2 is a sectional view of the same. Fig. 3 is a detail view of the same.

This invention has relation to railroad trucks; and the novelty consists in providing each axle with one fixed and one loose conical wheel, peculiarly constructed and arranged, as and for the purpose hereinafter described.

Referring to the drawing, A designates the frame of the truck, provided with the revolving axles B B, having any of the ordinary kinds of end bearings. C C′ designate the wheels, constructed with the usual form of track-bearing or rolling surfaces D and flanges D′. From the inner edges of the flanges to the inner extremities of the wheels the latter are conical in form, the object being to specially adapt the truck or car to which it appertains to use on railroads having prismoidal beds. The wheel C on each axle turns loosely thereon, but the wheel C′ is fixed, and at all times turns with the axle.

When the car is running on a straight track the wheels C rotate with the axle, and at the same rate of speed as the wheels C′; but in turning a curve the motion of the wheels C varies sufficiently to compensate for the difference in the diameters of the inner and outer rails. In this way friction and strain in turning curves are, to a great degree, avoided.

The wheels, it will be perceived, are cast hollow so as to be sufficiently light for ordinary use and to save stock. Each wheel C has two bearings, $d\ d'$, at its inner and outer ends or extremities. At the inner extremity of the wheel C′ is placed a hardened metallic collar, F, on the axle, midway between the ends. Another collar, G, is secured to the axle near one end, and fits closely a recess in the face of the wheel C′. This collar is also rigidly secured to said wheel.

The loose wheel is placed on axle against the solid roller at the end; then the loose collar F is placed against loose wheel; then the tight wheel is pressed on, making the whole secure.

The wheel C rotates in contact with one face of the collar F, and for this reason the latter is made of hardened metal so that it may not be easily worn by friction.

It will be observed that the loose wheels are on opposite sides of the truck. Provision is thus made for curves running in different directions.

K designates an orifice through the face of the loose wheel for the admission of oil to lubricate the axle and bearings.

I am aware that car-wheels have been constructed with curved inner flanges extending along the axle to considerable distance from the main bearing for bracing purposes. I make no claim to such invention; but

What I claim as new is—

In a car-truck, the fixed wheel C′ and the loose wheel C, said wheels having conical bearing-surfaces facing each other, and rail-treads extending outward therefrom, substantially as specified.

In testimony that I claim the above I have hereunto subscribed my name in the presence of two witnesses.

JOHN WILLIAM KERN.

Witnesses:
 GEO. WOODWARD,
 P. FERRY.